United States Patent
Tsao

(10) Patent No.: US 11,336,754 B1
(45) Date of Patent: May 17, 2022

(54) METHOD AND SYSTEM FOR CONCURRENT WEB BASED MULTITASKING SUPPORT

(71) Applicant: Sheng Tai (Ted) Tsao, Fremont, CA (US)

(72) Inventor: Sheng Tai Tsao, Fremont, CA (US)

(73) Assignee: Sheng Tai Tsao, Fremont, CA (US)

( * ) Notice: Subject to any disclaimer, the term of this patent is extended or adjusted under 35 U.S.C. 154(b) by 0 days.

(21) Appl. No.: 15/793,054

(22) Filed: Oct. 25, 2017

Related U.S. Application Data

(63) Continuation of application No. 14/267,831, filed on May 1, 2014, which is a continuation of application
(Continued)

(51) Int. Cl.

| | |
|---|---|
| *H04L 69/18* | (2022.01) |
| *H04L 67/06* | (2022.01) |
| *H04L 41/0806* | (2022.01) |
| *H04L 67/10* | (2022.01) |
| *H04L 67/02* | (2022.01) |
| *G06F 9/54* | (2006.01) |
| *G06F 9/52* | (2006.01) |
| *G06F 9/455* | (2018.01) |
| *H04L 47/783* | (2022.01) |

(52) U.S. Cl.
CPC .......... *H04L 69/18* (2013.01); *G06F 9/45558* (2013.01); *G06F 9/526* (2013.01); *G06F 9/54* (2013.01); *H04L 41/0806* (2013.01); *H04L 47/783* (2013.01); *H04L 67/02* (2013.01); *H04L 67/06* (2013.01); *H04L 67/10* (2013.01); *G06F 2009/45595* (2013.01); *G06F 2209/541* (2013.01)

(58) Field of Classification Search
CPC ..... H04L 69/18; H04L 41/0806; H04L 67/02; H04L 67/06; H04L 67/10; G06F 9/54; G06F 9/526; G06F 2209/45595; G06F 2209/541
See application file for complete search history.

(56) References Cited

U.S. PATENT DOCUMENTS

| | | | | |
|---|---|---|---|---|
| 5,287,521 A | * | 2/1994 | Nitta ....................... | G06F 9/526 |
| | | | | 707/999.008 |
| 5,745,747 A | * | 4/1998 | Chang ..................... | G06F 9/466 |

(Continued)

FOREIGN PATENT DOCUMENTS

GB        2312317 A    *   10/1997          G06F 11/006

OTHER PUBLICATIONS

Original Specification—U.S. Appl. No. 10/713,904. The originally filed specification, drawings and claims for asserted parent U.S. Appl. No. 10/713,904. pp. 1-8. Aug. 6, 2002.*

(Continued)

*Primary Examiner* — John M Macilwinen

(57) ABSTRACT

This invention presents a method and apparatus for solving a specific problem of web browser's display being blocked after a user submitted a task that will render the web browser becoming useless to a user for a period of time to prevent the user submitting other tasks. The success of solving this problem actually leads to the successful implementation of concurrent web based multitasking that improves the efficiency of utilizing resource for a computing device.

19 Claims, 3 Drawing Sheets

A Web Based Control System

Related U.S. Application Data

No. 12/075,314, filed on Mar. 4, 2008, now Pat. No. 8,799,473, which is a continuation of application No. 10/713,904, filed on Aug. 6, 2002, now Pat. No. 7,418,702.

(56) References Cited

U.S. PATENT DOCUMENTS

| | | | | |
|---|---|---|---|---|
| 5,838,316 A * | 11/1998 | Arruza | | G06F 3/04817 |
| | | | | 715/810 |
| 6,049,820 A * | 4/2000 | Murphy, Jr. | | H04L 49/90 |
| | | | | 709/203 |
| 6,070,184 A * | 5/2000 | Blount | | H04L 29/06 |
| | | | | 709/200 |
| 6,286,027 B1 * | 9/2001 | Dwyer, III | | G06F 9/384 |
| | | | | 712/217 |
| 6,327,628 B1 * | 12/2001 | Anuff | | G06F 17/30873 |
| | | | | 707/999.009 |
| 6,560,626 B1 * | 5/2003 | Hogle | | G06F 9/4812 |
| | | | | 718/102 |
| 6,639,687 B1 * | 10/2003 | Neilsen | | G06F 11/0715 |
| | | | | 358/1.1 |
| 7,155,727 B2 * | 12/2006 | Elving | | G06F 9/5016 |
| | | | | 719/312 |
| 7,219,346 B2 * | 5/2007 | Patiejunas | | H04L 29/06 |
| | | | | 709/202 |
| 2003/0065894 A1 * | 4/2003 | Bonola | | G06F 9/526 |
| | | | | 711/152 |
| 2006/0129652 A1 * | 6/2006 | Petrovskaya | | G06F 9/46 |
| | | | | 709/208 |

OTHER PUBLICATIONS

Gomez et al. "Efficient Multithreaded User-Space Transport for Network Computing: Design and Test of the TRAP Protocol". Journal of Parallel and Distributed Computing. Vol. 40. pp. 103-117. (Year: 1997).*

Brown, Marc H. and R. A. Shillner. "The DeckScape web browser." Conference Companion on Human Factors in Computing Systems. (Year: 1996).*

Edwards, Aled and Steve Muir. "Experiences implementing a high performance TCP in user-space." SIGCOMM '95. (Year: 1995).*

* cited by examiner

METHOD AND SYSTEM FOR CONCURRENT WEB BASED MULTITASKING SUPPORT

CROSS REFERENCE TO PRIOR ART

This application is a continuation of (a) U.S. patent application Ser. No. 14/267,831 filed on May 1, 2014, which in turn is a continuation of the U.S. patent application Ser. No. 12/075,314 filed on Mar. 4, 2008 and now a U.S. Pat. No. 8,799,473, which itself in turn is a continuation of U.S. patent application Ser. No. 10/713,904 filed on Aug. 6, 2002 and now is a U.S. Pat. No. 7,418,702. This application is also related to a U.S. patent application Ser. No. 10/116,511, entitled "Intelligent Distributed Virtual Server", filed on Apr. 5, 2002 by the same inventor of instant application, and now a U.S. Pat. No. 7,734,778. All of the applications and the patents referenced above are herein incorporate by references in their entirety for all purposes.

FIELD OF THE INVENTION

The present invention relates generally to support multiple concurrent tasks submitted from a single web browser window for web based control management system.

BACKGROUND OF THE INVENTION

The traditional web based control management system, such as the "Intelligent Distributed Virtual Server", is a web system configured to support multiple concurrent users' accessing. However, for each user's a web browser, the web system can only process one task at a time submitted from the user's web browser. This is due to the browser has to wait for the task to be finished before allowing the user to submit another task from the same browser. Therefore, the traditional web based system appears to process well for many tasks which could get quick responses and could be finished in a short period of time, such as check remote system's status and get remote system information and others. However, if people perform a task, such as transfer a 4 Gig Bytes of file to a remote system, this type of the task will take longer time to be finished. Therefore, due to waiting for completion of the transferring such larger sized file, the entire web browser in the web based control management system seems to be hanged or blocked and no other tasks could be performed in the same web browser window until the task of the file transferring being finished. Thus there is a need to solve such problem for the web based system for improving efficiency of utilizing the computing resources and providing better function to users.

SUMMARY OF THE INVENTION

To solve said problem of web browser blocking and effectively support multiple concurrent tasks for the web based control management system, an user space task list could be used combined with traditional lock or non-traditional distributed lock protection for effectively supporting the web browser, in the web based control management system, without waiting for completion of a task submitted thereof and further to achieve the supporting of concurrent web based user tasks.

DETAIL DESCRIPTION OF THE INVENTION

Figure 1:
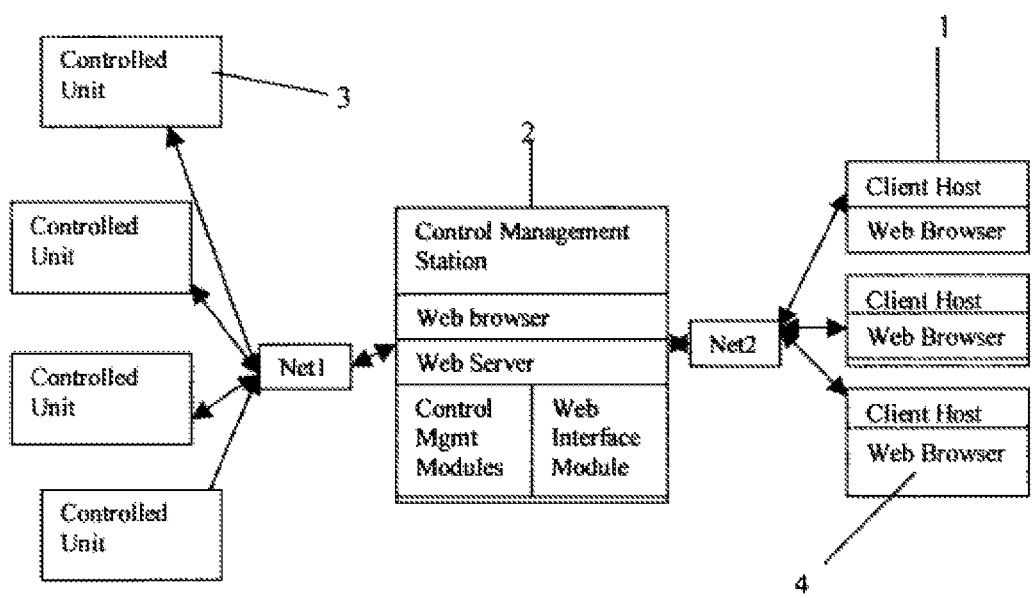
FIG. 1 illustrates an embodiment of a web based control management system such as the "Intelligent Distributed Virtual Server".

Embodiments of this invention are described herein in the context of method and system for solving said problem of web browser blocking and supporting concurrent web based multitasking. These and other features, aspects and advantages of this invention will become understood by people skilled in art for their own benefits of using and implementing the method and system disclosed herein with reference to the following description, appended claims and accompanying figures, where:

FIG. 1: shows an example of a simplified block diagram for an embodiment of web based control management system such as illustrated in the "Intelligent Distributed Virtual Server". The system includes:

Client hosts 1, where each client host 1 may be used by a user to submit certain tasks through a web browser configured thereof for performing tasks over the web based control management system.

Control management system 2, which includes web interface modules 4, control management modules 5 and web server software 6. It may also have a native (local) web browser 7 for user performing tasks over the web based control management system. The control management system 2 facilitates a web interface based on the web interface modules 4 to each of the client hosts 1 for the each of the client hosts 1 being used for communicating and transmitting web based tasks to the control management system 2 in respect to access the web based control management system by multiple concurrent users.

Controlled units 3, where each controlled unit 3 may be a server computer system, or an operational device or component. Each controlled unit 3 is configured with service modules 9 for providing information to or responding request (task) distributed from the control management system 2 that are similar to the controlled units in the "Intelligent Distributed Virtual Server".

The net1 represents a network connection between the control management system 2 and the controlled units 3. The network connection could comprise communication media such as cable (e.g. Ethernet, Fibre Channel, SCSI connection cable and others), and comprise bus, switches, routers, adaptors and others.

The net2, which represents another network connection between the control management system 2 and the client hosts 1. The network connection also comprises similar communication media such as the network cable (e.g. Ethernet, Fiber Channel, or SCSI connection cable and others), and comprises bus, switches; routers; adapters, and others.

Figure 3:
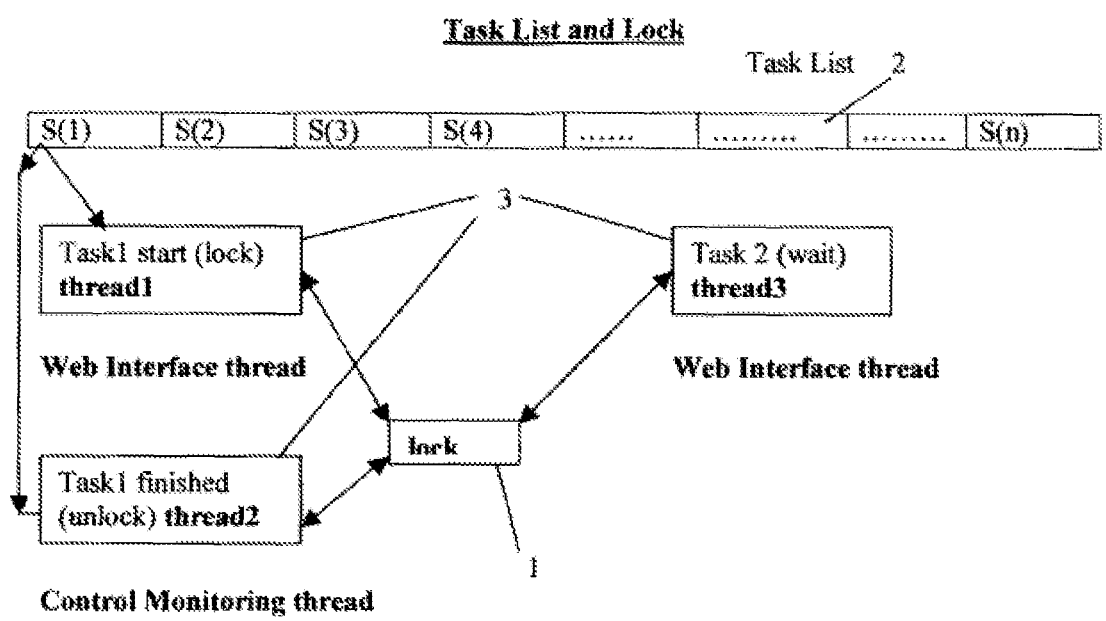
FIG. 3 illustrates an embodiment of a user space task list and the non-conventional distributed lock for protecting the storing information of a task.

FIG. 3 shows an example of a user space task list 8 and non-conventional distributed lock which is used to protect storing task information into the user space task list 8. The user space task list 8 can be used by the web interface modules 4 and/or control management modules 5 to support multiple concurrent tasks submitted from a web browser of each of users. For example, a task can be submitted through web based operation menu displayed in the web browser. The user space task list 8, the modules mentioned above, and the lock protection are further described below:

The user space task list 8 comprises a plurality of entries ("slot"), each slot on the list can be used to hold (store)

information of a task submitted from a web browser 7. The information of a task includes at least identification of a task such as task 1 or task 2, and includes information of what the task is about such as a task for transferring a file, a task for obtaining disk information or CPU information or memory information, and others. When an entry on the user space task list 8 is "not used", the entry is valid and available for storing information of a task. After the storing of the information of the task, the entry will be marked with a status of "used" to indicate that the entry is no longer available to other task. After the completion of the task processing, the entry will be marked with a status of "not used" to indicate the entry on the user space task list 8 is available again for being used by other task.

Distributed lock 9: contrary to the conventional lock such as semaphore based or Mutex based, the distributed lock 9 can be acquired by one thread and may be released by another thread. Therefore, the distributed lock is non-conventional lock for serving threads (or processes) to process tasks.

Threads are created upon executing code of said software modules of this invention by hardware processor, such as CPU, that is understood by people skilled in art and illustrated in the "Intelligent Distributed Virtual Server". In this invention, the major threads are:

1) Web interface thread, which is created basically for processing a task by executing the code of the web interface modules 4.

2) Control management thread, which is created basically for processing a task by executing code of the control management modules 5.

Figure 2:
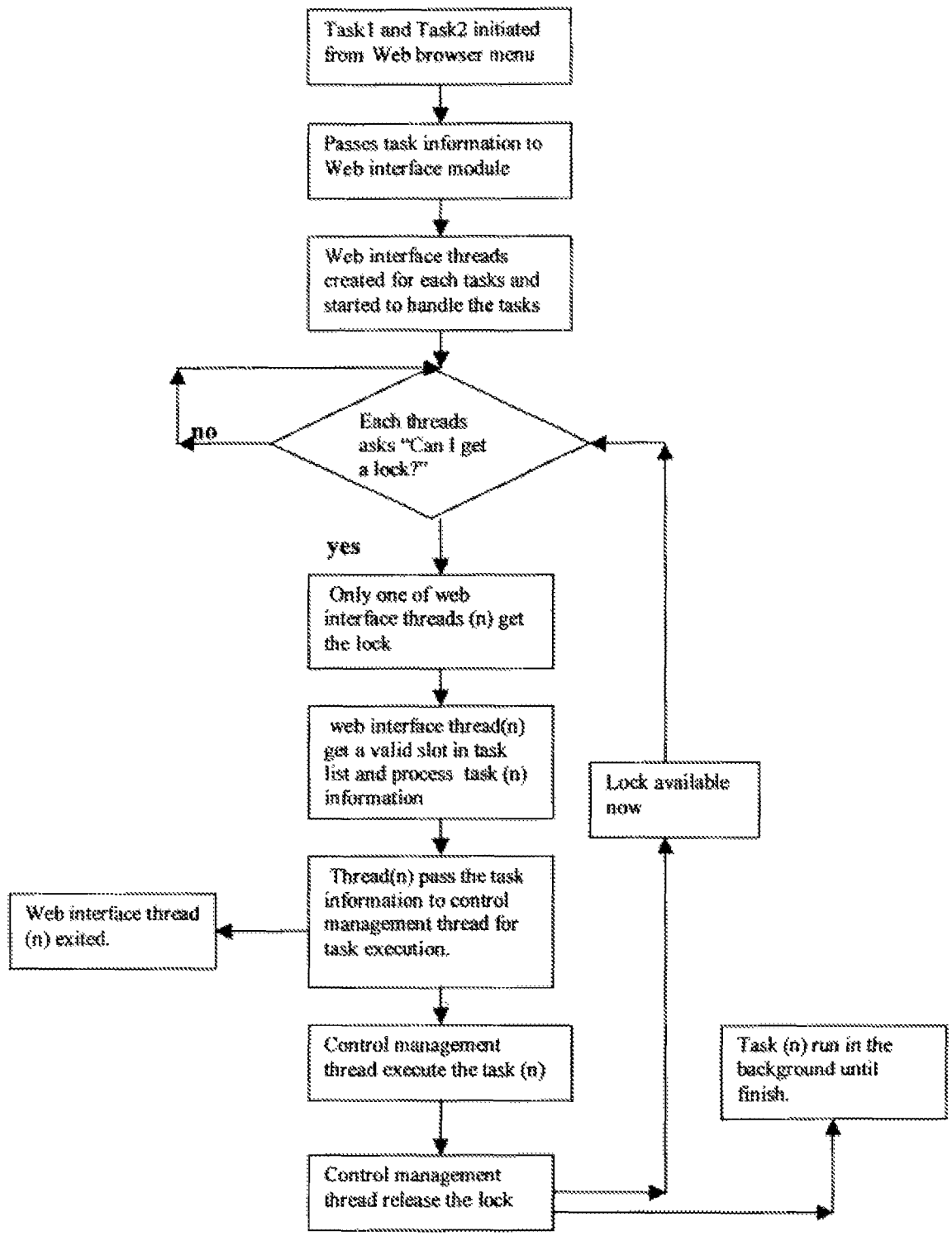
FIG. 2 illustrates an embodiment of an operational flow for processing the web based tasks.

It shall be aware that in addition to the embodiment of creating two threads to process a task as illustrated in the FIG. 2, in another embodiment of this invention, a single thread or single threaded process can be created to process a task by executing code based on both the web interface modules 4 and the control management modules 5 for the web based control management system. However, most principles for the embodiment of processing a task illustrated in the FIG. 2 and FIG. 3 of this invention could also apply to said deployment of the single thread for processing a task with an exception of a much simple conventional lock mechanism could be used therewith.

Furthermore, the FIG. 3 has actually illustrated a task 1 submitted from a web browser 7 being served by a web interface thread-1 and a control management thread-2, where the web browser 7 could be on the control management station 2 or on one of the client hosts 1 according to the FIG. 1. Similarly, a task 2, served by a web interface thread-3, could be also submitted from a browser residing either on the control management station 2 or on one of the client hosts 1.

The FIGS. 1, 2, and 3 have shown how can the web based multiple concurrent tasks be supported in the web based control management system. Now referring to the FIG. 2, the description bellow is corresponding to the web based task processing flow according to the FIG. 2 of this invention.

First, a task 1 (a first task) is submitted from a web browser on a client host 1 or on the control management system 2, such as submitted through operation menu to transfer a 4 Gig Bytes of data file to a remote controlled unit 3.

The web server 6 on the control management system 2 receives the task 1 transmitted via a query stream from the web browser 7 and passes the task 1's information to a web interface thread-1. As matter of a fact, for each task received, a corresponding web interface thread will be created, for example, a thread-1 is created for serving the task-1 and a thread-3 could be created for serving a task-2 as illustrated in the FIG. 3.

In order to prevent the possible race from other concurrent tasks being submitted from web browsers (e.g. the thread-3 with task 2 illustrated in the FIG. 3), the web interface thread-1 first acquires a lock such as a non-conventional distributed lock for obtaining an exclusive right for accessing an entry of the user space task list; second, provides status for entries on the user space task list by determining if an entry is "used" or "not used", and the web interface thread-1 allocates an entry (e.g. identifying an slot named as S1) in the user space task list 8 based on if the entry is "used" or "not used"; third, stores information of the task 1 into the identified "not used" entry S1; and fourth, further marks the entry S1 as "used" in the user space task list 8 to indicate the S1 is unavailable to other task.

Thereafter, the web interface thread-1 passes the task 1 information to the control management thread-2 for informing the control management thread-2 that the task 1 has been assigned to the entry S1, and further, the web interface thread-1 exits from its running. Next, the control management thread-2 starts data transfer task 1 according to the information of the task 1 stored in the entry (slot) S1 of the user space task list 8.

Specially, the control management thread-2 releases the lock and processes the task 1 to be run in the background of the control management operation. In another embodiment, the control management thread-2 can release the lock after the task 1 is finished, instead of releasing the lock after the task 1 running in the background.

As a result, the lock is available to other web interface threads, such as available to the thread-3 serving with task 2, where the thread-3 has waited for the lock. Therefore, the thread-3 can obtain this lock now. Further, this allows the thread-3 starts to work on the task-2 just like the thread 1 did for the task 1, for example, storing information of the task 2 into another identified "not used" entry on the user space task list 8 for further processing the task 2. Consequently, the task 2 can be run parallel with the background task 1 of the transferring of the 4 GB file because the task 1 takes long time to be finished.

Once the background task 1 of the 4 GB data file transferring being done, the entry (slot) S1 in the user space task list 8 will be reclaimed as "not-used", which then could be available to and used by other task in the future. Thus the data transfer task 1 will not block the web browser 7 in the web based control management system, therefore more tasks can be submitted from the web browser 7 and be run parallel with the task 1.

As matter of a fact, the control management station 2 is configured to respond to a task such as the task 2 submitted from a web browser without waiting for the completion of the task 1. In one embodiment, the responding to the task 2 not only includes storing information of the task 2 into the user space task list as discussed before, but also includes the control management system 2 provides response data such as status of the task 1 to the web browser 7. In addition, the status of the web based running tasks such as the task 1 can be monitored from the web user interface by examining the tasks in each entry (slot) in the user space task list 8. The quick responding to the task 2 has effectively eased the web browser's waiting for the completion of the task 1.

This invention has been described in considerable details with reference to certain preferred examples and embodiments herein. The method and solution described in this invention can be applied to all web based system for multiple concurrent tasks support. Therefore, the spirit and scope of this invention and the claims of this invention shall not be limited to those preferred examples and embodiments.

What is claims is:

1. A method implemented by a device to prevent blocking of a web browser, comprising:
    executing a local web browser on the device to display information for facilitating a user, through the information displayed, to submit tasks;
    executing a local web server on the device, the local web server managing task distribution and controlling processing of the tasks, where the local web server performs the steps including:
        identifying a first task in response to the first task being submitted by the user through the information displayed in the local web browser;
        storing information of the first task into a user space task list, including invoking lock protection for protecting the storing of the information of the first task;
        processing the first task, via communication with one or more remote servers on a network, according to the stored information of the first task, the processing performed in the background and without blocking the local web browser;
        responding to a second task before completion of the first task, where the second task is run in parallel with the first task when the user, through the local web browser, submits the second task;
        removing the stored information of the first task from the user space task list after the completion of the first task;
    wherein the local web server is further operable to accept remote requests from remote web browsers executing on remote clients, where the local web server further performs the steps including:
        identifying a third task in response to the third task being submitted by a remote user through information displayed in a remote web browser;
        storing information of the third task into a user space task list and invoking a lock protection for protecting the storing of the information of the third task;
        processing the third task, via communication with one or more external servers on a network, according to the stored information of the third task, in the background and without blocking the remote web browser.

2. The method of claim 1, wherein said identifying the first task comprises:
    identifying information related to the first task, including identifying identification and objective information of the first task.

3. The method of claim 1, wherein said storing information of the first task comprises:
    allocating a "not used" entry on the user space task list;
    storing the information of the first task into the "not used" entry; and
    marking the entry as "used" to prevent storing information of another task.

4. The method of claim 1, wherein said removing the stored information of the first task comprises:
    marking the entry, stored with the information of a task, on the user space task list as "not used" for allowing storing information of another task.

5. The method of claim 1, wherein said invoking lock protection comprises:
    acquiring a non-conventional lock by a first thread before said storing;
    releasing the non-conventional lock by a second thread after said storing; and marking the entry as "not used".

6. The method of claim 1, wherein said invoking a lock protection comprises:
    acquiring a lock by a thread before said storing and releasing the lock by the same thread after said storing.

7. The method of claim 1, wherein said processing the first task without blocking the local web browser comprises:
    the local web server obtaining a response, comprising the status of processing the first task; and
    the local web server delivering the response to the local web browser before completion of the first task to enable the user to perform other tasks, including monitor the processing of the first task.

8. The method of claim 1, wherein said processing the first task in the background comprises:
    creating a new thread and designating the created thread to process the first task.

9. The method of claim 1, wherein said responding to a second task comprises:
    storing information of the second task into a "not used" entry on the user space task list;
    invoking lock protection for protecting the storing via marking the entry as "used";
    processing the second task before completion of the first task according to the stored information of the second task via processing the second task parallel with the first task;
    marking the entry as "not used" after completion of the second task to allow storing information of another task.

10. A device comprising:
    a hardware processor, and
    one computer-readable storage device comprising program instructions which, when executed by the device, configure the device to control processing tasks, the device configured to:
    execute a local web browser to display information for facilitating a user, through the information displayed, to submit tasks;
    execute a local web server for managing task distribution and controlling processing of the tasks, where the local web server performs the steps including:
        identifying a first task in response to the first task being submitted by the user through the information displayed in the local web browser;
        storing information of the first task into a user space task list, including invoking lock protection for protecting the storing of the information of the first task;
        processing the first task, via communication with one or more remote servers on a network, according to the stored information of the first task, the processing performed in the background and without blocking the local web browser;
        responding to a second task before completion of the first task, where the second task is run in parallel with the first task when the user, through the local web browser, submits the second task;
        removing the stored information of the first task from the user space task list after the completion of the first task;
    wherein the local web server is further operable to accept remote requests from remote web browsers executing on remote clients, where the local web server further performs the steps including:
identifying a third task in response to the third task being submitted by a remote user through information displayed in a remote web browser;
storing information of the third task into a user space task list and invoking a lock protection for protecting the storing of the information of the third task;
processing the third task, via communication with one or more external servers on a network, according to the stored information of the third task, in the background and without blocking the remote web browser.

11. The device of claim 10, wherein said identifying the first task comprises:
identifying information related to the first task, including identifying identification and objective information of the first task.

12. The device of claim 10, wherein said storing information of the first task comprises:
allocating a "not used" entry on the user space task list;
storing the information of the first task into the "not used" entry; and
marking the entry as "used" to prevent storing information of another task.

13. The device of claim 10, wherein said removing the stored information of the first task comprises:
marking the entry, stored with the information of a task, on the user space task list as "not used" for allowing storing information of another task.

14. The device of claim 10, wherein said invoking lock protection comprises:
acquiring a non-conventional lock by a first thread before said storing;
releasing the non-conventional lock by a second thread after said storing, and marking the entry as "not used".

15. The device of claim 10, wherein said invoking a lock protection comprises:
acquiring a lock by a thread before said storing and releasing the lock by the same thread after said storing.

16. The device of claim 10, wherein said processing the first task without blocking the local web browser comprises:
the local web server obtaining a response, comprising the status of processing the first task; and
the local web server delivering the response to the local web browser before completion of the first task to enable the user to perform other tasks, including monitor the processing of the first task.

17. The device of claim 10, wherein said processing the first task in the background comprises:
creating a new thread and designating the created thread to process the first task.

18. The device of claim 10, wherein said responding to a second task comprises:

storing information of the second task into a "not used" entry on the user space task list;
invoking lock protection for protecting the storing via marking the entry as "used";
processing the second task before completion of the first task according to the stored information of the second task via processing the second task parallel with the first task;
marking the entry as "not used" after completion of the second task to allow storing information of another task.

19. A non-transitory computer-readable medium having instructions stored thereon that are executable by a computing device to perform operations, comprising:
execute a local web browser to display information for facilitating a user, through the information displayed, to submit tasks;
execute a local web server for managing task distribution and controlling processing of the tasks, where the local web server performs the steps including:
identifying a first task in response to the first task being submitted by the user through the information displayed in the local web browser;
storing information of the first task into a user space task list, including invoking lock protection for protecting the storing of the information of the first task;
processing the first task, via communication with one or more remote servers on a network, according to the stored information of the first task, the processing performed in the background and without blocking the local web browser;
responding to a second task before completion of the first task, where the second task is run in parallel with the first task when the user, through the local web browser, submits the second task;
removing the stored information of the first task from the user space task list after the completion of the first task;
wherein the local web server is further operable to accept remote requests from remote web browsers executing on remote clients, where the local web server further performs the steps including:
identifying a third task in response to the third task being submitted by a remote user through information displayed in a remote web browser;
storing information of the third task into a user space task list and invoking a lock protection for protecting the storing of the information of the third task;
processing the third task, via communication with one or more external servers on a network, according to the stored information of the third task, in the background and without blocking the remote web browser.

* * * * *

UNITED STATES PATENT AND TRADEMARK OFFICE
CERTIFICATE OF CORRECTION

PATENT NO. : 11,336,754 B1
APPLICATION NO. : 15/793054
DATED : May 17, 2022
INVENTOR(S) : Tsao Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 134 days.

Signed and Sealed this
Eighteenth Day of February, 2025

Coke Morgan Stewart
*Acting Director of the United States Patent and Trademark Office*